W. H. SMITH.
ELECTRICAL APPARATUS FOR HEATING LIQUIDS.
APPLICATION FILED DEC. 12, 1916.
1,277,657.
Patented Sept. 3, 1918.
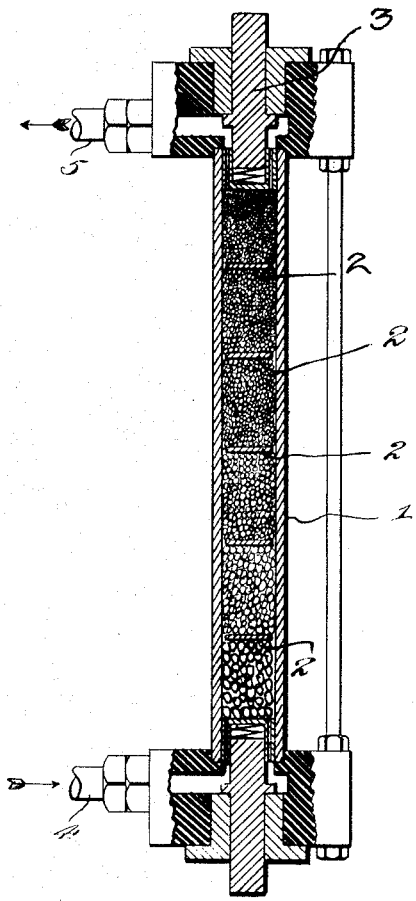
Inventor
WILLIAM HOGG SMITH
By Knight Bros
Attorneys.

UNITED STATES PATENT OFFICE.

WILLIAM HOGG SMITH, OF FALKIRK, ENGLAND, ASSIGNOR TO THE FILBAR ELECTRIC HEATER, LIMITED, OF LONDON, ENGLAND.

ELECTRICAL APPARATUS FOR HEATING LIQUIDS.

1,277,657.  Specification of Letters Patent.  Patented Sept. 3, 1918.

Application filed December 12, 1916. Serial No. 136,557.

*To all whom it may concern:*

Be it known that I, WILLIAM HOGG SMITH, of 7 Orchard street, Falkirk, Stirlingshire, England, have invented a new and useful Electrical Apparatus for Heating Liquids; and I do hereby declare the nature of this invention and in what manner the same is to be performed to be particularly described and ascertained in and by the following statement.

This invention relates to electrical apparatus for heating liquids of the type comprising a tube containing granules e. g. carbon granules constituting a resistance in an electrical circuit and traversed by the liquid to be heated.

Experience in connection with heaters has shown that the granules tend to become too tightly packed.

Also, a general desire has been expressed for a heating apparatus which will heat liquid in stages of progressively increasing temperature.

The object of this invention is to avoid the tendency for the granules to become too tightly packed and also to provide an arrangement whereby the granules are arranged so as to impart heat to the liquid in stages, the primary stages representing the cold zone and the final stages representing the hot zone.

To these ends, the invention consists broadly in a granule-containing tube partitioned into compartments the compartment at the inlet being packed with granules of low resistance and the compartment at the outlet being packed with granules of high resistance, the intervening compartments being packed with granules of progressively increasing resistance.

The invention is illustrated in section in the figure of the accompanying drawing.

As shown, the granule-containing tube 1 is partitioned into compartments by diaphragms 2.

The compartment adjacent to the inlet end 3 of the tube 1 contains granules of low resistance while the compartment adjacent to the outlet contains granules of high resistance and the intervening compartments contain granules, the resistance of which progressively increases from the inlet end toward the outlet end.

It will be seen that the diaphragms 2 serve to support the granules in the lower compartments against the direct pressure of the granules in the upper compartments and that tight packing is avoided.

The liquid passes into the tube 1 through an inlet connection 4 and out of the tube through an outlet connection 5 located at the bottom and top of the tube 1 respectively, as clearly shown in the drawing.

Having now particularly described and ascertained the nature of my said invention and in what manner the same is to be performed, I declare that what I claim is:—

1. In an electric heater the combination of a tubular container, a liquid inlet to said container and a liquid outlet from said container and a mass of progressively graded granular material.

2. In an electric heater the combination of a tubular container with liquid inlet and outlet, and granular material in said container progressively increasing in electrical resistance as it approaches said outlet.

3. In an electric fluid heater the combination of a mass of solid granules and a container for said granules partitioned in such a manner as to relieve the lowermost granules of the weight of the uppermost granules.

4. In an electric heater the combination of a tubular container, non-vertical partitions in said container, said non-vertical partitions forming compartments in said container and granular material lodged in said compartments.

5. In an electric heater the combination of a tubular container, a mass of granular material in said container and a plurality of partitions in said container, each supporting a portion of said granular mass.

6. An electric fluid heater comprising a vertical tube, terminals at the top and bottom of said tube, a mass of granular material disposed between said terminals and a horizontal partition extending across said tube and separating the upper granules from the lower granules.

7. An electric heater comprising in combination a vertical tube, terminals at the top and bottom of said tube, a plurality of horizontal partitions placed along the length of said tube, a liquid inlet at the bottom of said tube, a liquid outlet at the top of said tube and a mass of granular material in said compartments increasing in electrical resistance from the top to the bottom of said tube.

The foregoing specification signed at Glasgow this eighth day of January, 1917.

WILLIAM HOGG SMITH.